United States Patent [19]

Kanda et al.

[11] Patent Number: 4,820,777

[45] Date of Patent: Apr. 11, 1989

[54] REACTIVE, ACRYLIC RESIN MICRO-PARTICLES, THEIR PREPARATION AND CURABLE COMPOSITION CONTAINING THE SAME

[75] Inventors: Kazunori Kanda, Osaka; Satoshi Urano, Kyoto; Kei Aoki, Nara; Hisaichi Muramoto, Osaka, all of Japan

[73] Assignee: Nippon Paint Co., Ltd., Osaka, Japan

[21] Appl. No.: 915,795

[22] Filed: Oct. 6, 1986

[30] Foreign Application Priority Data

Oct. 9, 1985 [JP] Japan ................................ 60-225683

[51] Int. Cl.$^4$ .................... C08F 271/00; C08F 273/00
[52] U.S. Cl. ..................................... 525/291; 525/293
[58] Field of Search ............................... 525/293, 291

[56] References Cited
U.S. PATENT DOCUMENTS 4,717,643  1/1988  Scheve et al. ........................ 525/293

*Primary Examiner*—Jacob Ziegler
*Attorney, Agent, or Firm*—Wenderoth, Lind & Ponack

[57] ABSTRACT

A reactive acrylic resin micro-particle comprising a particulate body resin and a number of linear segments attached to said body resin and extending outwardly therefrom, said particulate body resin being composed of an internally gellated acrylic resin and having a mean grain diameter of 0.01 to 20 $\mu$ and said linear segments each being composed of a linear carbon chain of 1 to 100 carbon atoms, which may be interrupted by an oxygen, sulfur or nitrogen atom, which is connected at one end to said particulated body resin through a urethane, acyl urethane, urea or acyl urea bond and possessed of at the other end an ethylenically unsaturated bond. The invention also includes the preparation of said microparticles and a curable acrylic composition containing said microparticles, at least one polymerizable monomer or oligomer and a polymerization initiator.

3 Claims, No Drawings

REACTIVE, ACRYLIC RESIN MICRO-PARTICLES, THEIR PREPARATION AND CURABLE COMPOSITION CONTAINING THE SAME

FIELD OF THE INVENTION

The present invention relates to novel, reactive, acrylic resin micro-particles, their preparation and novel curable composition containing the same.

BACKGROUND OF THE INVENTION

Recently, public attention has been directed to a technique wherein internally gellated resin microparticles are added to an aqueous or a solvent type coating composition to increase the resinous content of the composition without undesired increase in viscosity thereof. However, heretofore proposed resin particles are merely of filler type and can never participate in the film forming. Therefore, the coating formed from such resin particle containing composition was indeed excellent in hardness and abrasion resistance, but was rather incapable of improvement in tensile strength. Thus, it always left something to be desired in heat resistance, water resistance and weathering property of the coating. Under the circumstances it would be of inestimable value of internally gellated resin particles could be obtained which are useful as an additive for a resinous solution and which are capable of resulting, when compounded with a reactive monomer or oligomer, a coating or cured product which is excellent in all respects of hardness, abrasion resistance, tensile strength, heat resistance, water resistance and weathering property. A principal object of the invention is, therefore, to provide such material. An additional object of the invention is to provide a method for the preparation of such resin particles. Further object of the invention is to provide a curable composition containing the same.

Having studied the behavior, in film forming, of resin microparticles themselves, the inventors have found that ethylenically unsaturated bonds carried on the surface of internally gellated resin particles can hardly participate in the film forming reaction, that when a carbon chain is connected to the particulate body resin and an ethylenically unsaturated bond is held at the end portion of said carbon chain, said bond can be easily taken into the film forming reaction, and that the said bond between the particulate body resin and the carbon chain can be easily and advantageously formed by the reaction between an active hydrogen bearing group and an isocyanate group and no adverse effects on film properties are resulted therefrom. On the basis of these important findings, the inventors have succeeded in establishing the invention and providing the present novel, reactive, acrylic resin micro-particles.

SUMMARY OF THE INVENTION

That is, according to the invention, said objects are fully attained by a reactive, acrylic resin micro-particle comprising a particulate body resin and a number of linear segments attached to said body resin and extending outwardly therefrom, said particulate body resin being composed of an internally gellated acrylic resin and having a mean diameter of 0.01 to 20μ and said linear segments each being composed of a linear carbon chain having 1 to 100 carbon atoms which may be interrupted by an oxygen, sulfur or nitrogen atom, which is connected at one end to said particulate body resin through a urethane, acyl urethane, urea or acyl urea bond and possessed of at the other end an ethylenically unsaturated bond.

Preferred embodiments of the invention

The present reactive, acrylic resin micro-particle is a novel resin particle heretofore unknown. The inventors have succeeded in obtaining such novel resin particle by either one of the following methods. That is, in preparing internally gellated acrylic resin micro-particles from a polyfunctional monomer having at least two $\alpha,\beta$-ethylenically unsaturated bonds and other polymerizable monomer(s) having one $\alpha,\beta$-ethylenically unsaturated bond, a polymerizable monomer or oligomer having in its molecule an active hydrogen bearing group and an amphoionic group of the formula:

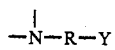

in which R is a substituted or unsubstituted $C_1$ to $C_6$ alkylene group or phenylene group; and Y is —COOH or —$SO_3H$, is used as a part of said other polymerizable monomer, or an oligomer having in its molecule both an active hydrogen bearing group and an amphoionic group of the formula

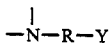

is present in the reaction system or a reactive monomer having in its molecule an active hydrogen bearing group is added at the later stage of polymerization to the reaction system, to obtain internally gellated resin particles having a mean grain diameter of 0.01 to 20μ and having on the respective grain surface a number of active hydrogen bearing groups. Thus obtained resin particles are then reacted with a vinyl isocyanate compound or first with a polyisocyanate compound having at least two isocyanate groups whose reactivities differ from each other, and then with a compound having an active hydrogen bearing group and an ethylenically unsaturated end bond, thereby obtaining the reactive, acrylic resin micro-particles each comprising a particulate body resin and a number of linear segments attached to said body resin and extending outwardly therefrom, said particulate body resin being composed of an internally gellated acrylic resin and having a mean grain diameter of 0.01 to 20μ and said linear segments each being composed of a linear carbon chain having 1 to 100 carbon atoms which may be interrupted by an oxygen, sulfur or nitrogen atom(s), which is connected at one end to said particulate body resin through a urethane, acyl urethane, urea or acyl urea bond, and possessed of at the other end an ethylenically unsaturated bond.

The aforesaid present method is characterized by the combination of technique (A) in which a conventional means such as emulsion polymerization, precipitation polymerization, seed polymerization and suspension polymerization is utilized for the preparation of internally gellated acrylic resin particles having a mean grain diameter of 0.01 to 20μ and having on the respective grain surface a number of active hydrogen bearing groups such as hydroxyl, amino and the like, and technique (B) in which the reaction between an active hydrogen bearing groups and a highly reactive isocyanate group is utilized for the connection of carbon chain segment having an ethylenically unsaturated end group to the particulate body resin.

The first method used in the preparation of internally gellated acrylic resin particles having on the respective grain surfaces a number of active hydrogen bearing groups is to add as a part of polymerizable monomer, to a reaction mixture, a polymerizable monomer or oligomer having in its molecule both an active hydrogen bearing group such as hydroxyl or amino group, and an amphoionic group of the formula

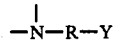

which will exhibit the role of surface active agent. At that time, the said monomer or oligomer may directly participate in the formation of resin particles, and is maldistributed at the respective grain surface area due to the self-surface activity thereof. Therefore, thus formed resin particles are internally gellated and the active hydrogen bearing groups are always on the surface of the respective resin particles.

Examples of such polymerizable monomers or oligomers are of acrylic nature, having in its molecule (1) an amphoionic group of the formula:

(in which R is substituted or unsubstituted $C_1$ to $C_6$ alkylene group or phenylene group, and Y is —COOH or —$SO_3H$), (2) an active hydrogen bearing group such as hydroxyl,or amino group and the like, and (3) a reactive, ethylenically unsaturated bond. More specifically, they may include the following as described in Japanese Patent Application Kokai Nos. 51050/80; 53251/80; 145249/81; and 145250/81 as well as U.S. Pat. No. 4,461,870.

The compounds represented by any one of the following formulae:

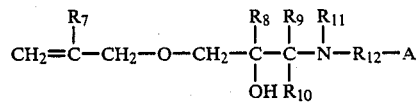

wherein $R_7$, $R_8$, $R_9$ and $R_{10}$ each represents a member selected from the group consisting of H, $CH_3$ and $C_2H_5$, $R_{11}$ is hydrogen or alkyl having 1 to 20 carbon atoms optionally including in its chain any one of —SO—, —COO— and —O— groups, $R_{12}$ represents alkylene group having 1 to 12 carbon atoms, optionally substituted with —OH, —SH, —$SR_{13}$ (in which $R_{13}$ is alkyl having 1 to 4 carbon atoms) or one or more of alkyl having 1 to 4 carbon atoms, and A represents COOH or $SO_3H$ group;

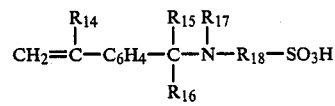

wherein $R_{14}$, $R_{15}$ and $R_{16}$ each represents H or alkyl having 1 to 6 carbon atoms, $R_{17}$ represents hydrogen or alkyl having 1 to 20 carbon atoms, optionally including in its chain any one of —SO—, —COO— and —O— group, or $R_{17}$ represents a radical of the formula:

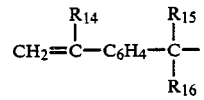

$R_{18}$ represents alkylene having 2 to 12 carbon atoms, optionally substituted with one or more of alkyl groups having 1 to 6 carbon atoms;

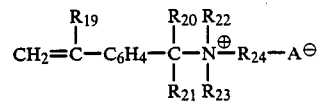

wherein $R_{19}$, $R_{20}$ and $R_{21}$ are the same or different and each represents H or $CH_3$, $R_{22}$ represents $C_1$ to $C_{20}$ alkyl having at least one hydroxl group and optionally containing in its alkyl structure a group of —O— or —COO—, $R_{23}$ represents $C_1$ to $C_{20}$ alkyl having at least one hydroxyl group and optionally containing in its alkyl structure a group of —O— or —COO—, or H or $C_1$ to $C_{20}$ alkyl, $R_{24}$ represents optionally substituted $(CH_2)n$ (in which n is an integer of from 1 to 6), and A is COO or $SO_3$; and

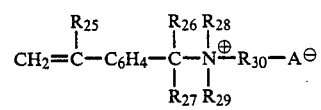

wherein $R_{25}$, $R_{26}$ and $R_{27}$ are the same or different and each represents H or $CH_3$, $R_{28}$ and $R_{29}$ are the same or different and each represents $C_1$ to $C_{20}$ alkyl optionally containing —O— or —COO—, or cycloalkyl group, or $R_{28}$ and $R_{29}$ taken together may form a hetero-ring containing nitrogen atom, $R_{30}$ represents optionally substituted alkylene $(CH_2)_n$ in which n is an integer of from 1 to 6, and A is COO or $SO_3$. Among them, the compounds having considerably higher molecular weights are referred to as oligomers in this specification.

The second method for giving active hydrogen bearing groups on the respective grain surfaces of the internally gellated acrylic resin particles is to effect the polymerization of polyfunctional monomer having at least two $\alpha,\beta$-ethylenically unsaturated bonds and other polymerizable monomer(s) having one $\alpha,\beta$-ethylenically unsaturated bond, in the presence of an oligomer having in its molecule both active hydrogen bearing group and amphoionic group of the formula:

Such oligomer can be any of the coating use resins such as alkyd resin, polyester resin, modified epoxy resin, acrylic resin, melamine resin, polyether resin and the like. Alkyd resin and polyester resin are characterized by forming a series of ester chains using as essential components polycarboxylic acid and polyhydric alcohol. Therefore, when a part of said polyhydric alcohol is replaced by, for example, a compound of the formula:

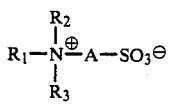

wherein $R_1$ represents an alkyl having at least one hydroxyl group, $R_2$ and $R_3$ are the same or different, each represents hydrogen or optionally substituted alkyl group, and A represents optionally substituted alkylene having 1 to 6 carbon atoms or phenylene group, it is possible to obtain alkyd or polyester resin having the abovesaid amphoionic group in its molecule. Reference may be made in this connection to Japanese Patent Applications of Nippon Paint Co., Ltd, Nos. 110865/79 and 56048/80 (Kokai Nos. 34725/81, 51727/81), filed on Aug. 30, 1979 and Apr. 26, 1980, respectively.

Among these resins, the members having an acid value of 30 to 150, and especially 40 to 150, and number average molecular weight of 500 to 5000, and especially 700 to 3000 are preferably used in this invention.

Modified epoxy resins having the characteristic amphoionic radical of the formula:

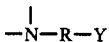

are stated, for example, in Japanese Patent Application of Nippon Paint Co., Ltd, No. 116293/80, filed on Aug. 22, 1980 (now laid open as Kokai No. 40522/82). In general, epoxy resin is characterized by having at the end of the polymer chain a group of the formula:

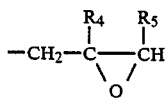

wherein $R_4$ and $R_5$ each represents hydrogen or methyl group. Therefore, it is possible to obtain a modified epoxy resin having at the end of the polymer chain a quantity of such radical as

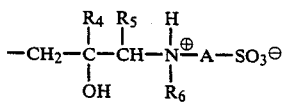

by the reaction of said epoxy resin with a compound of the formula:

$R_6$-NH-A-SO$_3$M wherein $R_6$ is an alkyl group optionally substituted with a radical incapable of reacting with epoxy group, M stands for alkali metal or ammonium, and A has the same meaning as defined above. In proportion to the quantity of said amphoionic groups, the hydrophilic property of the modified epoxy resin will increase. Reference may be made in this connection to Japanese Patent Application of Nippon Paint Co., Ltd, No. 116293/80, filed on Aug. 22, 1980 (now laid open as Kokai No. 40522/82). An acrylic resin having in its molecule a radical of the formula:

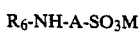

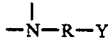

can be advantageously prepared by a solution polymerization using a free radical initiator from the combination of at least one polymerizable amino acid compound selected from

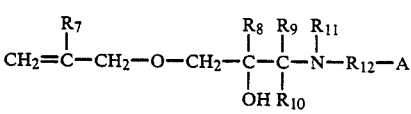

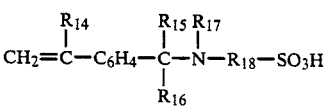

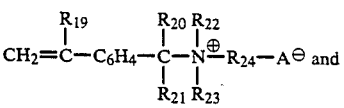

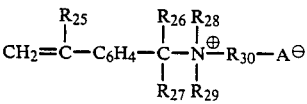

and at least one polymerizable monomer selected from hydroxy bearing monomers, carboxyl bearing monomers, glycidyl bearing monomers, alkyl acrylates or methacrylates, N-containing alkyl acrylates or methacrylates, polymerizable amides, polymerizable nitriles, polymerizable aromatic compounds, α-olefins, vinyl compounds and diene compounds already stated hereinbefore. As to the details of these polymerizable amino acid compounds, reference should be made to Japanese Patent Applications of Nippon Paint Co., Ltd, Nos. 123899/78 (Kokai No. 51050/80), 125996/78 (Kokai No. 53251/80), 47651/80 (Kokai No. 145249/81) and 47652/80 (Kokai No. 145250/81), and as to amphoionic radical bearing acrylic resin, to Japanese Patent Application of Nippon Paint Co., Ltd, No. 71864/81 filed on May 12, 1981. Preferably, these acrylic resins should have an acid value of 30 to 180, most preferably 40 to 160, and number average molecular weight of 500 to 10,000, and most preferably 700 to 6000.

Melamine resins having a

radical may be prepared by using at least one hydroxyl bearing aminosulfonic type amphoionic compound represented by the formula:

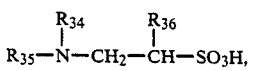

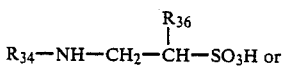

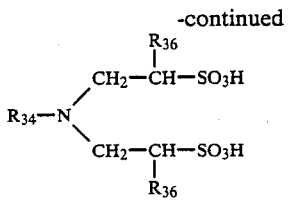

wherein $R_{34}$ represents $C_1$ to $C_{20}$ hydroxyalkyl optionally containing in the alkyl structure a group of —O— or —COO—, $R_{35}$ has the same meaning as $R_{34}$ or represents lower alkyl, and $R_{36}$ represents H or methyl group, together with melamine and formaline and following the conventional means. The reaction conditions and procedures used are not of a specific nature and in this connection, reference should be made to, for example, "A guide of synthetic resins for coating composition" by K. Kitaoka, published on May 25, 1974, Kobunshi Kankokai, pages 134 to 139. The abovesaid hydroxy bearing aminosulfonic type amphoionic compounds are described in more minute detail in Japanese Patent Application by Nippon Paint Co., Ltd, No. 170624/79 (now laid open as Kokai No. 92859/81). Polyether resin having a

group may be prepared, as stated in Japanese Patent Application No. 116293/80 (Kokai No. 40522/82) filed on Aug. 22, 1980, by Nippon Paint Co., Ltd, by reacting a compound of the formula:

$$R_{33}\text{-NH-A-SO}_3M$$

wherein $R_{33}$ is a substituent incapable of reacting with epoxy group, A represents an alkylene or phenylene, and M stands for alkali metal or ammonium group, with a polyether type epoxy resin having at the end of the polymeric chain a group of the formula:

wherein $R_{31}$ and $R_{32}$ each represents hydrogen or methyl group, thereby obtaining a modified polyether type epoxy resin having at the end of the polymeric chain a group of the formula:

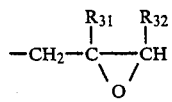

Various polyether type epoxy resins are commercially available and they may be advantageously used in this invention.

The third method for giving active hydrogen bearing groups on the respective grain surfaces of the internally gellated acrylic resin particles is to add, at the later stage of polymerization of polyfunctional acrylic monomer and other polymerizable acrylic monomer(s), to the polymerization mixture a reactive acrylic monomer having in its molecule an active hydrogen bearing group such as hydroxyl or amino group. Examples of such reactive monomers are hydroxyl bearing monomers such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, and lactone-(meth) acrylate adducts obtained by the reaction between lactone and hydroxy alkyl (meth) acrylate. Said lactone may be represented by the formula:

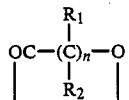

in which $R_1$ and $R_2$ each represents hydrogen or hydrocarbon residue and n is an integer of 4 to 7.

Particulary preferable lactone is $\epsilon$-caprolactone. As the hydroxyalkyl (meth) acrylate to be used for the preparation of lactone- (meth) acrylate adducts, mention is made of 2-hydroxyethyl (meth) acrylate, 2-hydroxypropyl (meth) acrylate, 4-hydroxybutyl acrylate, 2-hydroxy-3-chloro-propyl (meth) acrylate and the like.

Another groups of said reactive monomers are nitrogen containing alkyl (meth) acrylates such as dimethyl aminoethyl acrylate, dimethyl aminoethyl methacrylate and the like; acryl amides, methacryl amides and the like.

In the present invention, internally gellated acrylic resin particle, i.e. particulate body resin, having a mean diameter of 0.01 to $20\mu$ and having on the grain surface the active hydrogen bearing groups is first prepared as hereinabove stated, and a number of linear segments each having an end, ethylenically unsaturated bond are then connected thereto, by using either one of the following methods.

That is, in the first method, a vinyl isocyanate compound having a reactive, ethylenically unsaturated bond and an isocyanate group is directly reacted with said particulate body resin having active hydrogen bearing groups on the surface thereof.

Examples of said vinyl isocyanate compounds are isocyanate ethyl methacrylate, isocyanate acrylate, isocyanate methyl acrylate and the like. At that time, a number of linear segments each having an end, ethylenically unsaturated bond are connected to the particulate body resin via urethane, acyl urethane, urea or acyl urea bond through the reaction of active hydrogen bearing group and isocyanate group.

In the second method, to the particulate body resin having in its molecule the active hydrogen bearing groups, a compound with at least two isocyanate groups each having different reactivity is first reacted, thereby obtaining the particulate body resin to which a number of segments each having an end isocyanate group are connected through urethane, acyl urethane, urea or urea bond respectively, and then a compound having both $\alpha,\beta$-ethylenically unsaturated bond and an active hydrogen bearing group, such as, for example, 2-hydroxyethyl (meth) acrylate, (meth) acrylamide and the like, is reacted thereto to introduce an end, ethylenically unsaturated, bond through the reaction between the active hydrogen and the aforesaid isocyanate group, to each of said segments.

The reaction between an isocyanate group and an active hydrogen bearing group may be easily carried out at room temperature, and the progress of said reaction may be easily traced and confirmed by checking the disappearance of isocyanate groups and increase in amide bonds by means of IR, NMR and the like.

Thus obtained resin microparticles are characterized by that each particle comprises an internally gellated, particulate resin body having a mean grain diameter of 0.01 to 20μ, to which a number of linear carbon chain segments each bearing an end, ethylenically unsaturated bond are connected through a urethane, acyl urethane, urea or acyl urea bond, respectively and that the ethylenically unsaturated bond located at the end portion of each linear segment is very reactive and easily participates in the film forming reaction when compounded with other polymerizable monomer or oligomer bearing α,β-ethylenically unsaturated bond and reacted under illumination with an actinic radiation or in the presence of peroxide initiator.

Therefore, in the second aspect of this invention, there is provided a curable composition comprising said reactive resin particles and α,β-ethylenically unsaturated monomer or oligomer.

When the composition is used as a material to be cured by an actinic radiation, the following are in general, included besides the abovesaid resin particles:

(1) photocurable (or non-crosslinking) polymer or oligomer,
(2) photocurable monomer or low molecular weight oligomer,
(3) photopolymerization initiator (or sensitiser) and
(4) heat polymerization inhibitor (or stabilizer).

Among them, (2) and (3) are essential, in this invention. Other additives such as sensitiser aids, coloring matter and the like may be added, if desired.

Examples of said photocurable polymer or oligomers are unsaturated polyester resins, urethane acrylate resins, epoxy acrylate resins, polyester acrylate resins, spirane acrylate resins, polyether acrylate resins and the like.

Examples of photocurable monomers or low molecular weight oligomers are low molecular weight oligomers of (1), as well as styrene, vinyl toluene, divinyl benzene, vinyl acetate, acrylonitrile, methacrylonitrile, acrylic esters such as methyl acrylate, ethyl acrylate, butyl acrylate, 2-ethyl hexyl acrylate, glycidyl acrylate, ethyleneglycol diacrylate, trimethylol propane triacrylate and the like, methacrylic esters such as methyl methacrylate, ethyl methacrylate, butyl methacrylate, 2-ethyl hexyl methacrylate, glycidyl methacrylate, ethyleneglycol dimethacrylate, trimethylol propane trimethacrylate and the like, diethyl itaconate, dibutyl itaconate, diethyl fumarate, diethyl maleate and the like.

Examples of said sensitisers are benzoin, benzoin methyl ether, benzoin propyl ether, benzoin butyl ether, benzophenone, diacetyl, benzil, dibutyl sulfide, dibenzyl sulfide and the like. Examples of said heat polymerization inhibitors are hydroquinone, t-butyl hydroquinone, p-methoxy phenol, catechol, benzoquinone and the like.

The actinic radiations used may include ultraviolet rays, electron rays, X rays and other radiations.

The ultraviolet rays include the rays with 100 to 400 nm wavelengths. Particular preference is given to Deep UV having relatively short wavelengths of 200 to 300 nm. The energys of said rays are in general 70 to 300 K cal/mol, which are almost the same with the bond-dissociation energys of organic compounds. When an organic molecule is illuminated by such light and excited, it is decomposed to give radicals, which will lead to radical polymerization. When electron rays, X rays or other radiations (as α rays, β rays, γ rays, hard X rays and the like) are utilized, ions, excited molecules and radicals are produced by the interaction of orbital electrons of atoms in a material and high energy illumination, and the curing in question might be caused by said radicals.

When the present resin particles are used in a coating composition, said particles, as stated hereinbefore, directly participate in the film forming reaction. In this regard, the present resin particles absolutely differ from heretofore proposed resin particles for coating use. Furthermore, since the present resin particles are fixedly anchored on the coating, no slipping would occur even when the coating is subjected to a large deforming stress such as stretching and the like, and marked improvements in various properties, such as hardness, abrasion resistance, tensile strength, impact strength, heat resistance, water resistance and weathering property can be realized therewith. Similar improvements may be obtained with other products than coating compositions with the present resin particles. Thus, the present curable composition is useful, besides the coating composition, as printing materials in letterpress printing, lithography, intaglio printing and screen process printing; curable printing ink; packaging medium; adhesives; resist, dry film and sealing compound for electronic parts such as shadow mask, printed circuit, IC and LSI in electronics industry; photoresist for plates and part products in metal pretreatment, ceramics, glass, fine mechanical, building material, automobile and ship industries; surface treating agent in textile industry; enzyne fixing agent in the biomedical industry; decayed tooth filler and the like.

From the standpoint of the abovesaid coating properties, the inventors have found that the resin particles should preferably have a mean grain diameter of 0.01 to 20μ and the carbon chain segments should preferably have 1 to 100 carbon atoms. On the basis of these findings, the invention has been made.

The invention shall now be more fully explained in the following Examples. Unless otherwise stated, all parts and percentages are by weight.

REFERENCE EXAMPLE 1

Preparation of methacryloyl isocyanate Into a suspension of 17.9 g of methacrylamide and 0.18 g of hydroquinone in 100 ml of chloroform, was added dropwise, under cooling at 0° C. in ice-water and introducing a nitrogen gas stream, a solution of 20 ml of oxalyl chloride in 15 ml of chloroform. After completion of said addition, the mixture was stirred at room temperature for about 100 minutes, added with 0.18 g of hydroquinone and then heated under stirring, at 60° C. for 4 hours. After cooling to room temperature, the reaction mixture was concentrated under reduced pressure and then distilled to obtain a methacryloyl isocyanate boiling at 52 to 53° C./39 mmHg, as a colorless liquid.

REFERENCE EXAMPLE 2

Preparation of emulsifier having an amphoionic group Into a 2 liter flask fitted with a stirrer, a nitrogen gas inlet tube, a thermoregulator, a condenser and a decanter, were placed 134 parts of bishydroxyethyl taurine, 130 parts of neopentyl glycol, 236 parts of azelaic acid, 186 parts of phthalic anhydride and 27 parts of xylene, and the mixture was heated while removing the formed water azeotropically with xylene. The temperature was, at that time, raised to 190° C. in about 2 hours from the commencement of reflux and the reaction was continued at the same temperature, under stirring and while removing water, until the resinous acid value based on said carboxylic acids reached 145. The mixture was then allowed to cool to 140° C., dropwise added at 140° C. with 314 parts of glycidyl versatate (Cardura E-10, trademark of Shell Co.) in 30 minutes and then stirred for 2 hours.

Thus obtained polyester resin showed an acid value of 59, a hydroxyl value of 90 and a number average molecular weight $\overline{Mn}$ of 1054.

REFERENCE EXAMPLE 3

Preparation of resin microparticles (particulate body resin)

Into a 1 liter reaction vessel fitted with a stirrer, a condenser and a thermoregulator, were placed 580 parts of deionized water, 45 parts of the amphoionic group bearing emulsifier obtained in Reference Example 2 and 6.6 parts of dimethyl ethanolamine and the mixture was heated under stirring to 80° C. to have a clear solution. To this, were dropwise added in 90 minutes a solution of 2.5 parts of azobiscyanovaleric acid in 50 parts of deionized water added with 1.6 parts of dimethyl ethanolamine, and mixed solution of 50 parts of ethyleneglycol dimethacrylate, 50 parts of styrene, 50 parts of methyl methacrylate, 70 parts of n-butyl acrylate and 30 parts of 2-hydroxyethyl methacrylate and the combined mixture was stirred for additional 90 minutes to obtain an aqueous dispersion of resin microparticles. The non-volatile content of said dispersion was 31.5% and the mean diameter of said resin particles was 58 nm.

REFERENCE EXAMPLE 4

Into a similar reaction vessel as used in Reference Example 3, were placed 216 parts of deionized water and while maintaining the temperature at 80° C. and stirring, a mixed solution of 4.5 parts of azobiscyanovaleric acid, 4.28 parts of dimethyl ethanolamine, and 45 parts of deionized water was added thereto.

Thereafter, at the same temperature, the first mixed solution of 6 parts of N-(2-hydroxy-3-allyloxy propyl) taurine, 2.1 parts of dimethyl ethanolamine, 6 parts of 2-hydroxyethyl acrylate and 90 parts of deionized water and the second mixed solution of 77.4 parts of methyl methacrylate, 108.2 parts of n-butyl acrylate, 77.4 parts of styrene, 24 parts of 2-hydroxyethyl acrylate and 6 parts of tetraethylene glycol dimethacrylate were dropwise and simultaneously added in 60 minutes. After completion of said addition, a mixed solution of 1.5 parts of azobiscyanovaleric acid, 1.42 parts of dimethyl ethanolamine and 1.5 parts of deionized water was added at the same temperature and stirring was continued for additional 60 minutes to obtain a dispersion of resin microparticles having a non-volatile content of 45%, pH=7.8. The mean diameter of said microparticles was 0.2μ.

REFERENCE EXAMPLE 5

Into a 1 liter reaction vessel fitted with a stirrer, a condenser and a thermoregulator, were placed 900 parts of isopropyl alcohol, and the temperature was raised, while introducing a nitrogen gas, to 50° C. To this, was dropwise added a mixture of 7 parts of styrene, 9 parts of methyl methacrylate, 9 parts of n-butyl acrylate, 3 parts of 2-hydroxyethyl methacrylate, 2 parts of acrylamide, and 20 parts of ethyleneglycol dimethacrylate, and after stirring for 10 minutes, 1g of azobis isobutyronitrile were added and the mixture was heated gradually to 70° C. and reacted for 4 hours. The formed white resin precipitates were filered, washed three times with isopropyl alcohol and dried in a vacuum drier to obtain resin microparticles. The mean diameter of thus obtained primary particles was 1.3μ (determined by SEM observation).

REFERENCE EXAMPLE 6

Preparation of resin microparticles

Into a 1 liter reaction vessel fitted with a stirrer, a condenser and a thermoregulator, were placed 1000 parts of deionized water and 20 parts of polyvinyl alcohol having an average molecular weight of 2500 and the mixture was heated, while purging with a nitrogen gas and stirring at 1000 rpm. to 60° C.

To this, was added dropwise a mixture of 10 parts of styrene, 10 parts of methyl methacrylate, 15 parts of n-butyl acrylate, 5 parts of 2-hydroxyethyl methacrylate, 2 parts of acrylamide, 5 parts of trimethylol propane triacrylate, 10 parts of divinyl benzene and 1 part of 2,2′-azobis (2,4-dimethyl valeronitrile) (polymerization initiator) in 1 hour. After completion of said addition, the combined mixture was heated to 70° C. and reacted at the same temperature for 5 hours to obtain a dispersion of resin particles. The suspension was then subjected to a centrifugal separator and thus separated resin particles were again dispersed in a deionized water. The same procedures were repeated three times to obtain resin microparticles having a mean diameter of 15μ.

REFERENCE EXAMPLE 7

Preparation of reactive polyether acrylate resin oligomer

Into a similar reaction vessel as used in Reference Example 3, were placed 300 parts of n-butyl acetate, 200 parts of polytetramethylene glycol, 44.4 parts of isophorone diisocyanate and the mixture was stirred well. 0.25 part of dibutyl tin dilaurate was then added and the mixture was heated at 80° C. for 1 hour.

While maintaining the temperature at 80° C., 23.5 parts of 2-hydroxyethyl acrylate and 0.28 part of hydroquinone were dropwise added to the reaction system in 1 hour and the combined mixture was kept standing for 4 hours. At this stage, the disappearance of the characteristic absorption peak due to NCO group in an infrared absorption spectrum was confirmed. Thus, a reactive polyether acrylate resin oligomer was obtained.

REFERENCE EXAMPLE 8

Preparation of reactive acrylic resin oligomer Into a similar reaction vessel as used in Reference Example 3, were placed 165 parts of xylene and while heating and introducing a nitrogen gas stream, a mixture of 50 parts of styrene, 125 parts of methyl methacrylate, 150 parts of 2-hydroxyethyl acrylate, 150 parts of ethyl hexyl acrylate, 25 parts of methyl acrylate, 25 parts of lauryl mercaptane and 10 parts of Kaya-ester 0 (trademark, polymerization initiator, Kayaku Nooly K.K.) was dropwise added in 3 hours to obtain an acryl resin having a number average molecular weight of 5500 and a hydroxyl value of 144. After cooling to 30° C., 28.5 parts of methacryloyl isocyanate obtained in Reference Example 1 and 1.0 part of hydroquinone were dropwise added, so that 2/10 -hydroxyl groups of said acryl resin could be reacted with said isocyanate compound. After completion of said addition and confirming the disappearance of absorption peak by NCO group in an infrared absorption spectrum, the reaction mixture was subjected to a vacuum distillation to remove the volatile materials. Thus, a reactive acryl resin oligomer having a non-volatile content of 98% and a viscosity of 200 poise was obtained. The number average molecular weight of said oligomer was 5900.

REFERENCE EXAMPLE 9

Into a similar reaction vessel as used in Reference Example 2, were placed 69 parts of triethylene glycol, 131 parts of SB-20 (aliphatic dicarboxylic acid having a long carbon chain ($C_{20}$), trademark of Okamura Seiyu K.K.) and 50 parts of xylene and the mixture was reacted at 180 to 200° C. until the resinous acid value reached 0.1. After cooling, 235 parts of xylylene diisocyanate and 50 parts of n-butyl acetate were added and the combined mixture was thoroughly stirred. Next, 0.5 part of dibutyl tin dilaurate was added and the mixture was heated to 80° C. and maintained at the same temperature for 1 hour. To this, while maintaining the temperature at 80° C., were added dropwise 43.2 parts of Placsell FA-2 (2-hydroxyethyl acrylate modified with 2 moles of ε-caprolactone, trademark of Daisel Chem. Ind.) and 0.5 part of hydroquinone in 1 hour and the mixture was kept standing for 3 hours to obtain a reactive, polyester acrylate resin.

REFERENCE EXAMPLE 10

Into a similar reaction vessel as used in Reference Example 2, 190 parts of YD-011 (bisphenol A type epoxy resin, epoxy equivalent 450 to 500, trademark of Tohto Kasei K.K.), 100 parts of n-butyl acetate, 28.8 parts of acrylic acid and 1.1 parts of diethyl aminoethyl methacrylate were placed and the mixture was reacted at 120° C. for 4 hours until the resinous acid value reached less than 5. Thus, a reactive, epoxy acrylate resin was obtained.

EXAMPLE 1

(1) Preparation of reactive resin microparticles

Into a reaction vessel fitted with a stirrer, a thermoregulator, a reflux condenser and a vacuum device, were placed 317 parts of the resin particle dispersion obtained in Reference Example 3, and 500 parts of xylene, and contained water was azeotropically distilled off to obtain a xylene dispersion (A) of said resin microparticles having a non-volatile content of 33%. The water content of this dispersion was 200 ppm. To this, while maintaining the temperature at 30° C., were dropwise added 8.6 parts of methacryloyl isocyanate obtained in Reference Example 1 and 0.1 part of hydroquinone in 20 minutes.

Thus obtained product was confirmed to be a dispersion of reactive resin microparticles (B) each comprising an internally gelated particulate body resin joined with a number of linear segments each having an end ethylenically unsaturated bond through an acyl urea bond by the following analysis.

That is, in an infra-red spectrographic examination, it was confirmed that the absorption peak at 2250 $cm^{-1}$ coming from —NCO group was disappeared and the absorption peak at 3300 $cm^{-1}$ due to -NH group and the peak at 1760 $cm^{-1}$ due to acylcarbonyl group which was somewhat shifted from that of common carbonyl were detected. Furthermore, in a nuclear magnetic resonance spectrography (NMR), were detected the appearance of new signal of -NH proton and about 0.3 ppm chemical shift to a higher magnetic field due to the vinyl proton.

(2) Preparation of UV light curable composition and film 29 parts of said dispersion (B) were combined and thoroughly mixed with 190 parts of the polyether resin obtained in Reference Example 7 and 4 parts of benzoin methyl ether, and the solvent was removed from the mixture to obtain a UV light curable composition containing reactive resin microparticles. This composition was then applied onto a clean glass plate in 100μ thickness and subjected to a UV light treatment under the following conditions to obtain a cured film.

UV light treatment conditions

Hight pressure mercury lamp HI-20N (trademark of Nihon Denchi, 80 W/cm type, fitted with collector lense) was placed 80 mm above the conveyer so that the lamp length direction could be perpendicular to the moving direction of said conveyer. The conveyer's speed was set to 3 m/minute.

Physical properties

The cured film was then removed from the glass plate and film properties were tested. The results are as follows:

elongation 110% and breaking strength 0.4 $Kg/mm^2$ at 20° C.

elongation 105% and breaking strength 0.35 $Kg/mm^2$ at 80° C.

By a scanning electron microscopic examination, certain crazes were observed at the fractured surface of the test sample (20° C.).

Coating test of photo-glass fiber

Glass fibers mainly of quartz glass having a diameter of 100μ were made by spinning and thus formed fibers were coated, immediately after said spinning, with the abovesaid curable composition so as to give a coating with 50 μ thickness and then treated with a UV light to obtain the coated photo-glass fibers. This product showed, even when bended, no cracking and chipping of the coating and had a satisfactory tensile strength.

Comparative Example 1

Repeating the same procedures of Example 1 but substituting 29 parts of the xylene dispersion (A) of resin microparticles for the dispersion (B), a UV light curable composition was obtained and a cured film was prepared as in Example 1.

Tensile strength test was conducted with the cured film, and it was found that at 20° C., elongation was 105% and fracture strength was 0.3 $Kg/mm^2$, and at 80° C., elongation was 103% and fracture strength was 0.25 $Kg/mm^2$.

This showed that the comparative film was inferior, in fracture strength, to the cured film of Example 1 based on the reactive resin microparticles.

When a test sample was examined at 20° C. by scanning electron microscopy, there were many crazes at the fractured surface of said sample.

EXAMPLE 2

The similar procedures as stated in Example 1 were repeated. Into a reaction vessel, 228 parts of resin microparticle dispersion obtained in Reference Example 4 and 500 parts of toluene were placed and the contained water was azeotropically removed with toluene to obtain a toluene disperion (C) of resin microparticles having a non-volatile content of 17.6%.

To this dispersion, while maintaining the temperature at 80° C., was added dropwise a mixture of 0.2 part of dibutyl tin dilaurate, 0.2 part of hydroquinone and 15 parts of isocyanate ethyl methacrylate in 30 minutes.

The completion of said reaction was confirmed by an infrared spectroscopic examination and a dispersion (D) of reactive resin microparticles each comprising an internally gelated particulate body resin joined with a number of linear segments each having an end ethylenically unsaturated bond through an urethane bond was obtained.

66 parts of thus obtained dispersion (D) were mixed with 85 parts of the reactive acrylic resin oligomer obtained in Reference Example 8 and the solvent was removed off. To this, were added 10 parts of trimethylolpropane triacrylate and 2 parts of benzoin methyl ether to obtain a UV light curable composition. The composition was then applied onto a clean vinyl tile in a wet thickness of 40μ and the coating was cured by a UV light as in Example 1. The pencil hardness of thus obtained film was 2H and the wear resistance was excellent, i.e. 20 mg abrasion in Taber abrasion test (1000 g load, 100 times rotation).

COMPARATIVE EXAMPLE 2

Repeating the same procedures of Example 2 but substituting 85 parts of the toluene dispersion (C) of the resin microparticles for the dispersion (D), a UV light curable composition was obtained and the cured film was prepared as in Example 2. At that time, the pencil hardness of thus obtained film was H and the wear resistance was inferior to that of the film of Example 2 (i.e. 35 mg abrasion in Taber abrasion test under the same test conditions).

EXAMPLE 3

50 parts of the resin microparticles obtained in Reference Example 5 were dispersed in 500 parts of xylene and the dispersion was placed in a similar reaction vessel as used in Reference Example 3, together with 10.8 parts of isophorone diisocyanate. After mixing, 0.1 part of dibutyl tin dilaurate was added thereto and the combined mixture was heated to 80° C. and maintained at the same temperature for 3 hours. Thereafter, 28.9 parts of Placsel FA-4 (trademark, 2-hydroxyethyl acrylate modified with 4 moles of ε-caprolactone, Daisel Chem. Co.) and 0.1 part of hydroquinone were dropwise added to the reaction mixture at 80° C., in 1 hour, and the combined mixture was allowed to stand for 3 hours. The end point of the reaction was confirmed by checking the disappearance of the characteristic peak at 2260 cm$^{-1}$ of —NCO group in an infrared absorption spectrum. Thus, a disperion (E) of reactive resin microparticles was obtained. 100 parts of the dispersion (E) were mixed with 117 parts of the polyester acrylate resin obtained in Reference Example 9 and the solvent was removed off to obtain an electron beam curable composition.

Thus obtained composition was applied onto a zinc phosphate-treated steel plate (0.5 mm thickness) so as to give a dry thickness of 50μ, preheated at 60° C. for 20 minutes and then exposed to electron beams of 300 KeV and 30 mA, thereby giving 3 Mrad total beams, to effect curing of the coating. Thus obtained film showed no surface tackiness and had a pencil hardness of H. Du Pont impact test result (at −10° C.) showed no cracking under the conditions of 500 g and 50 cm and salt spray test result with Erichsen 2 mm extruded portion showed no rusting in 48 hours.

COMPARATIVE EXAMPLE 3

50 parts of the resin microparticles obtained in Reference Example 5 were dispersed in 500 parts of xylene to obtain a resin dispersion. 165 parts of thus prepared resin dispersion were mixed with 117 parts of the polyester acrylate resin obtained in Reference Example 9 and the solvent was removed off to obtain an electron beam curable composition. The composition was applied onto a zinc phosphate-treated steel plate and cured as in Example 3. The pencil hardness of the film was H. Du Pont impact test result showed crackings under 500 g and 30 cm conditions and salt spray test of Erichsen 2 mm extruded portion showed rusting in 48 hours.

EXAMPLE 4

50 parts of the resin microparticles obtained in Reference Example 6 and 250 parts of toluene were placed in a vessel and mixed well. The mixture was then placed in a similar reaction vessel as used in Reference Example 3, added with 11.1 parts of isophorone diisocyanate and 0.06 parts of dibutyl tin dilaurate, and heated to 80° C. and maintained at the same temperature for 1 hour. Next, 5.6 parts of 2-hydroxyethyl acrylate and 0.1 part of hydroquinone were dropwise added to the reaction mixture maintained at 80° C., in 30 minutes and the combined mixture was kept standing for 4 hours. By confirming the disappearance of characteristic peak of —NCO absorption in an infra-red absorption spectrum, a reactive resin microparticle dispersion (F) was obtained. A curable composition was then prepared by mixing 100 parts of the abovesaid dispersion (F), 116 parts of the epoxy acrylate resin obtained in Reference Example 10, 3 parts of Kayamec A (methyl ethyl ketone peroxide-dimethyl phthalate 55% solution, radical curing catalyst, trademark, Kayaku Nooly K.K.) and 1.5 parts of 6% cobalt naphthenate solution. The composition was applied onto a tin plate (250 mm × 25 mm) in 70μ thickness. After setting for 40 minutes, said plate was covered with a separate tin plate so that the curable composition be sandwiched by the plates. These plates were bonded by applying 5 Kg/cm$^2$ pressure and baking at 100° C. for 30 minutes. T peeling test was conducted with thus obtained plate and the following test results were obtained:

6 Kg/25 mm at 20° C. and 5.1 Kg/25 mm at 80° C.

COMPARATIVE EXAMPLE 4

The same procedures as stated in Example 4 were repeated excepting substituting the resin microparticles prepared by Reference Example 6 for the reactive resin microparticle dispersion (F). At that time, T peeling test results were as follows:

4.8 Kg/25 mm at 20° C. and 3.3 Kg/25 mm at 80° C.

EXAMPLE 5

Into a similar reaction vessel as used in Reference Example 3, were placed 100 parts of the dispersion (B) of reactive resin microparticles obtained in Example 1 and 200 parts of xylene and heated under nitrogen gas stream. To this, a mixture of 50 parts of styrene, 70 parts of methyl methacrylate, 70 parts of n-butyl acrylate, 10 parts of 2-hydroxyethyl methacrylate and 4 parts of Kaya ester 0 was dropwise added in 3 hours to obtain an acryl resin containing resin microparticles. It was found that the grain diameter of the contained resin microparticles was increased from the original size to 72 nm. This shows that a certain degree of acrylic polymerization was also started from the ethylenic unsaturated bonds on the surface of each resin microparticle.

REFERENCE EXAMPLE 11

Into a similar reaction vessel as used in Reference Example 3, were placed 580 parts of deionized water, 45 parts of the amphoionic group bearing emulsifier obtained in Reference Example 2 and 6.6 parts of dimethyl ethanol amine and the mixture was heated to 80° C. to get a clear solution. To this, were dropwise and simultaneously added a solution of 1.0 part of azobiscyanovaleric acid in 25 parts of deionized water and 0.64 parts of diethyl methanol amine and the first monomer solution of 30 parts of ethyleneglycol dimethacrylate, 50 parts of styrene, 50 parts of methyl methacrylate and 70 parts of n-butyl acrylate in 60 minutes. Thereafter, a solution of 0.5 part of azobiscyanovaleric acid in 25 parts of deionized water and 0.32 part of diethyl methanol amine and the second monomer solution of 20 parts of ethyleneglycol dimethacrylate and 30 parts of 2-hydroxyethyl methacrylate were simultaneously and dropwise added to the reactor in 30 minutes. Finally, the combined mixture was stirred for 90 minutes to obtain an aqueous dispersion of resin microparticles having a mean diameter of 65 nm. The non-volatile content of said dispersion was 31.5%.

EXAMPLE 6

(1) Preparation of reactive resin microparticles Into a similar eraction vessel as used in Example 1, were placed 317 parts of the resin particle dispersion obtained in Reference Example 11 and 500 parts of xylene, and the contained water was azeotropically distilled off to obtain a xylene dispersion (G) of said resin microparticles having a non-volatile content of 33%. The water content of this dispersion was 200 ppm.

To this, while maintaining the temperature at 30° C., were dropwise added 8.6 parts of methacryloyl isocyanate obtained in Reference Example 1 and 0.1 part of hydroquinone in 20 minutes, and a reactive resin microparticle containing dispersion (H) was prepared. The characteristic features of thus obtained resin microparticles were confirmed by the similar analysis as shown in Example 1.

(2) UV light curable composition and cured film were prepared as in Example 1, excepting substituting said dispersion (H) for the dispersion (B).
Physical properties of the cured film were as follows:
elongation 108%, breaking strength 0.5 Kg/mm² at 20° C.
elongation 104%, breaking strength 0.4 Kg/mm² at 80° C.

Glass fibers were also coated with this curable compositon, cured by UV light and evaluated as in Example 1. The results were almost similar with those of Example 1.

EXAMPLE 7

A UV light curable composition was prepared by mixing 20 parts of reactive resin microparticle dispersion (B) obtained in Example 1, 40 parts of n-hexyl methacrylate, 30 parts of n-butyl acrylate, 20 parts of methyl methacrylate, 80 parts of NK ester M-230G (methoxy polyethylene glycol methacrylate, trademark, Shin-Nakamura Kagaku K.K.) and 4 parts of benzoin methyl ether.

Thus obtained composition was applied onto a clean Pyrex glass plate and a separate Pyrex glass plate was placed thereon. While applying pressure, the sandwiched assembly was treated with UV light as in Example 1 to obtain a cured film. The formed film was peeled out and dried by keeping it under reduced pressure (less than 5 Torr) at room temperature for 8 hours, to obtain a film having a dry thickness of 80μ.

What is claimed is:

1. A reactive acrylic resin microparticle comprising a particulate body resin and a number of linear segments attached to said body resin and extending outwardly therefrom, wherein said particulate body resin is composed of an internally crosslinked acrylic resin derived from at least one $\alpha,\beta$-ethylenically unsaturated monomer and a polyfunctional monomer having at least two $\alpha,\beta$-ethylenically unsaturated bonds and has a mean grain diameter of 0.01 to 20μ, and each of said linear segments is composed of a linear, methylene chain having 1 to 100 carbon atoms or a linear methylene chain having 2 to 100 carbon atoms interrupted by oxygen, sulfur or nitrogen, one end of each methylene chain being connected to said particulate body resin through a urethane, an acyl urethane, a urea or an acyl urea bond and the other end of each methylene chain bearing a reactive ethylenically unsaturated bond.

2. A process for preparing reactive acrylic resin microparticles of claim 1, which comprises:
preparing internally crosslinked acrylic resin particles having a mean grain diameter of 0.01 to 20μ and having on the respective grain surfaces a number of active hydrogen bearing groups, said particles being prepared from a polyfunctional monomer having at least two $\alpha,\beta$-ethylenically unsaturated bonds and at least one other polymerizable monomer having one $\alpha,\beta$-ethylenically unsaturated bond, by (1) using as a part of said other polymerizable monomer a polymerizable monomer or oligomer having in its molecule both an active hydrogen bearing group and an amphoionic group of the formula:

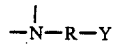

in which R is a substituted or unsubstituted $C_1$ to $C_6$ alkylene or phenylene group, and Y is —COOH or —SO$_3$H, (2) effecting the polymerization of said polyfunctional monomer and at least one other polymerizable monomer in the presence of an oligomer having in its molecule both an active hydrogen bearing group and an amphoionic group of the formula:

in which R and Y are as defined above, or (3) effecting the polymerization of said polyfunctional monomer and at least one other polymerizable monomer and at a comparatively later stage of said polymerization, adding a reactive acrylic monomer having in its molecule an active hydrogen bearing group and continuing the polymerization; and reacting said particles directly with a vinyl isocyanate compound or first with a polyisocyanate having at least two isocyanate groups whose reactivities differ from each other and then with a compound having an active hydrogen bearing group and an end ethylenically unsaturated bond.

3. A curable acrylic composition comprising:
(a) reactive acrylic resin microparticles according to claim 1;
(b) at least one $\alpha,\beta$-ethylenically unsaturated bond bearing monomer or oligomer; and
(c) a polymerization initiator.

* * * * *